W. H. NOELTING.
SOCKET FOR CASTERS.
APPLICATION FILED JULY 28, 1919.
1,346,239.
Patented July 13, 1920.
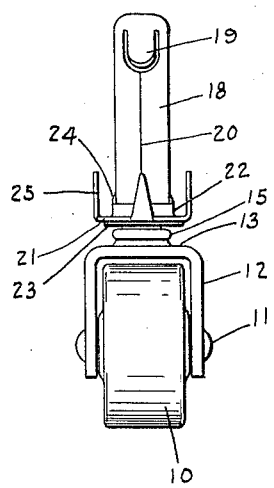
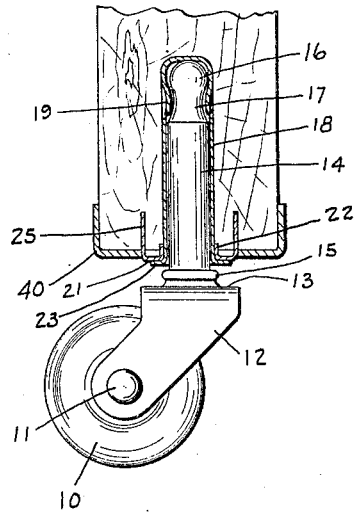
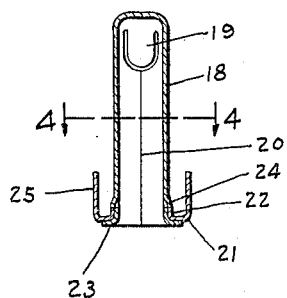
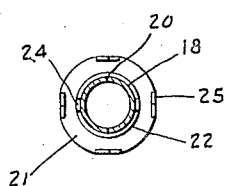
INVENTOR.
WILLIAM H. NOELTING.
BY
*Lockwood Lockwood*
ATTORNEYS.

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

SOCKET FOR CASTERS.

1,346,239. Specification of Letters Patent. Patented July 13, 1920.

Application filed July 28, 1919. Serial No. 313,836.

*To all whom it may concern:*

Be it known that I, WILLIAM H. NOELTING, a citizen of the United States, and a resident of Evansville, county of Vanderburg, and State of Indiana, have invented a certain new and useful Socket for Casters; and I do hereby declare that the following is a full, clear, and exact description thereof, reference being had to the accompanying drawings, in which like numerals refer to like parts.

The object of this invention is to provide a satisfactory caster construction for the leg of a phonograph cabinet, or like furniture. One feature of the invention consists in the combination with the leg of a phonographic cabinet or the like, of a socket for the stem of the castor with the lower end of the socket turned outwardly, and a ferrule covering the lower end of the leg of the cabinet through which the socket extends, and a plate surrounding and secured to the socket and resting between the flange at the lower end of the socket and the leg of the furniture, and being provided with a number of relatively long sharp prongs adapted to extend through said ferrule and penetrate the wood of the leg of the phonograph cabinet or the like and secure said ferrule and also the socket thereto.

The full nature of the invention will be understood from the accompanying drawings and the following description and claims.

Figure 1 is a front elevation of a caster with the socket and plate on the stem. Fig. 2 is a side elevation of a central vertical section through the socket and plate and the lower part of the leg of the phonograph cabinet. Fig. 3 is a vertical section through the socket and holding plate on a plane at right angles to the section plane of Fig. 2. Fig. 4 is a section on the line 4—4 of Fig. 3.

There is shown herein a caster having a caster wheel 10, a rivet 11 for mounting it on the arms 12 of an apron 13. The caster stem 14 is at its lower end secured to the apron, and this may be accomplished by upsetting the lower end of the stem on the under side of the apron 13 and providing a shoulder 15 on the stem upon the apron, although this invention is not limited to the particular construction of the foregoing parts.

The caster stem at its upper end is provided with a round-like head 16, with a reduced portion or neck 17. The socket 18, when completed, is tubular and just large enough to receive the stem 14, and the upper end of the socket is provided with a pair of oppositely located tongues 19 curved inwardly in concavo-convex form to lie in the contracted neck portion 17 and prevent the escape of the head of the caster stem, and therefore the escape of the caster, except when force is applied to the latter for removing the caster and stem from the union thereof with the socket and leg of the cabinet.

The socket is herein shown as formed of a single strip of metal bent midway of its ends and its two ends brought together, and being semi-circular in cross section the two ends form a tubular socket with the seam line 20. The tongues 19 are punched in the middle of the metal strip before it is bent to form the socket, and at that stage they extend laterally and from the middle of the strip of metal. Consequently when the socket is formed the tongues are in line with the seam lines 20, although the invention is not necessarily limited to the details of the foregoing construction.

The lower end of the leg of the cabinet is covered by a ferrule or cap 40 through which the socket 14 extends. A plate 21 in annular shape, as shown in Fig. 4, fits or is slipped over the end of the socket 14 and fits snugly thereon under the ferrule 40. Said plate is held on the socket by outwardly flaring the lower end of the socket to form an annular laterally extending flange 23, after the plate 21 is in place on the socket, and therefore the flange supports the plate 21 and also clamps it and the upwardly extending collar 22 against a plurality of projections 24 formed in or extending from the socket so as to extend outwardly, as shown in Fig. 2. In this economical manner the plate 21 is secured to the socket.

The plate 21 has a plurality of long prongs 25 extending upwardly from its margin. There are four prongs shown and they are preferably integral with the plate 21 and stamped out at the time the plate is formed and afterward bent upwardly, as shown in Figs. 1 and 2. They are relatively long so that when the socket is inserted in the leg of the cabinet the prongs 25 will extend through the ferrule or cap 40 and when driven into the wooden leg of the cabinet, substantially as shown in Fig. 2, will secure the ferrule 40 and also the socket 18 to the leg of the cabinet, thus performing a double function in an economical and effective manner which has met with great favor and success.

The invention claimed is:

1. A tubular socket for the stem of a caster for the wooden leg of a cabinet or the like, a ferrule to cover the end of said leg, and an annular plate surrounding the lower part of said socket and secured thereto and provided with long upwardly extending prongs which are adapted to extend through said ferrule and penetrate the leg and secure thereto said ferrule and socket.

2. A tubular socket for the stem of a caster for the wooden leg of a cabinet or the like, said socket having an outwardly projection above its lower end, a ferrule to cover the end of the leg, and an annular plate with a central opening and upwardly extending collar to surround the lower part of the socket and with long prongs extending upwardly from the outer edge of the plate and through said ferrule and adapted to be driven into the lower end of the leg of a cabinet, the lower end of the socket having an outwardly turned flange which secures said plate and the collar thereof on said socket between said flange and the projection from the socket above the collar on said plate.

In witness whereof I have hereunto affixed my signature.

WILLIAM H. NOELTING.